Jan. 14, 1964

V. G. CAGGIANO, JR 3,117,632

CULTIVATOR

Filed June 15, 1961

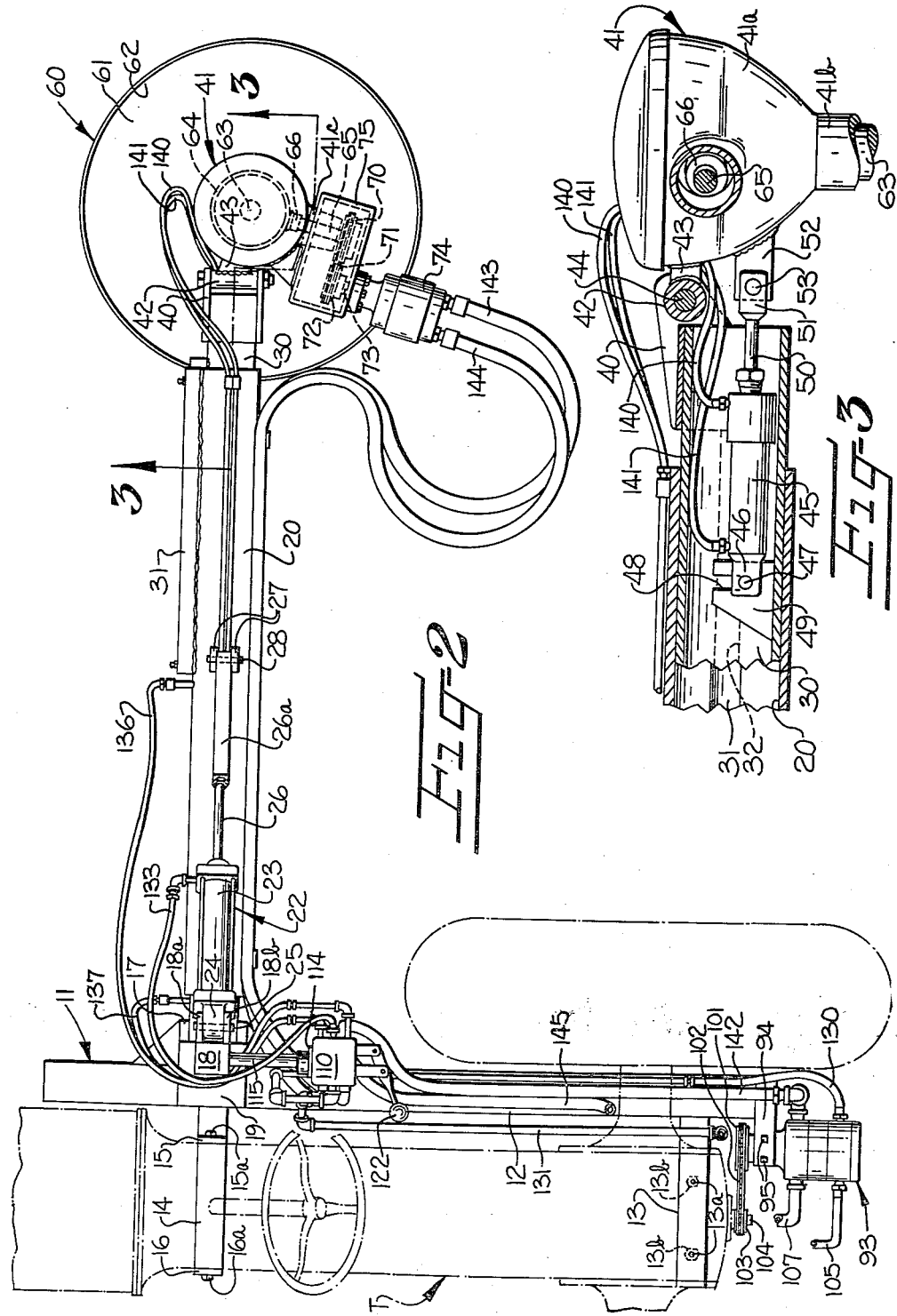

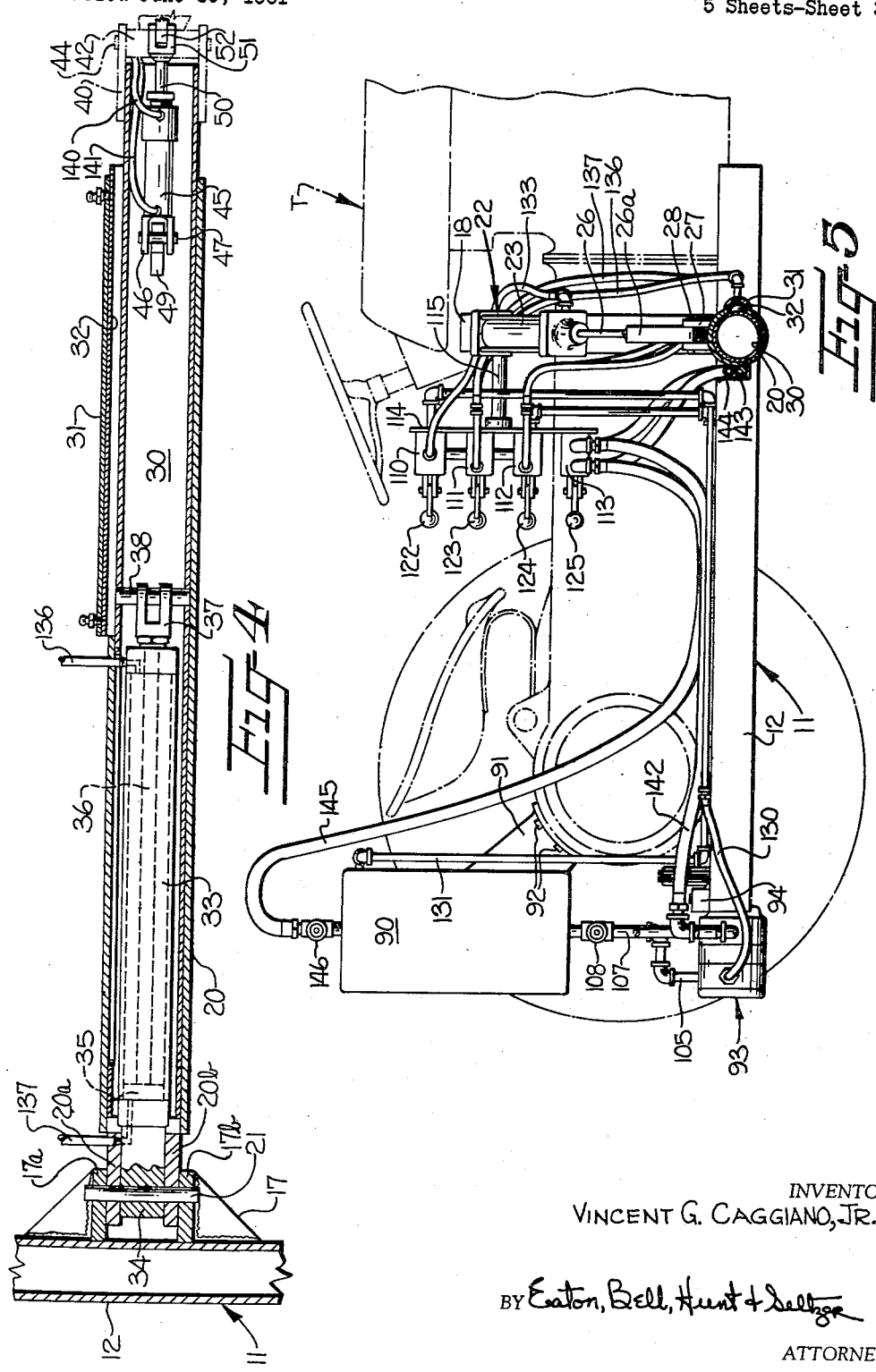

Jan. 14, 1964    V. G. CAGGIANO, JR    3,117,632
CULTIVATOR
Filed June 15, 1961    5 Sheets-Sheet 4
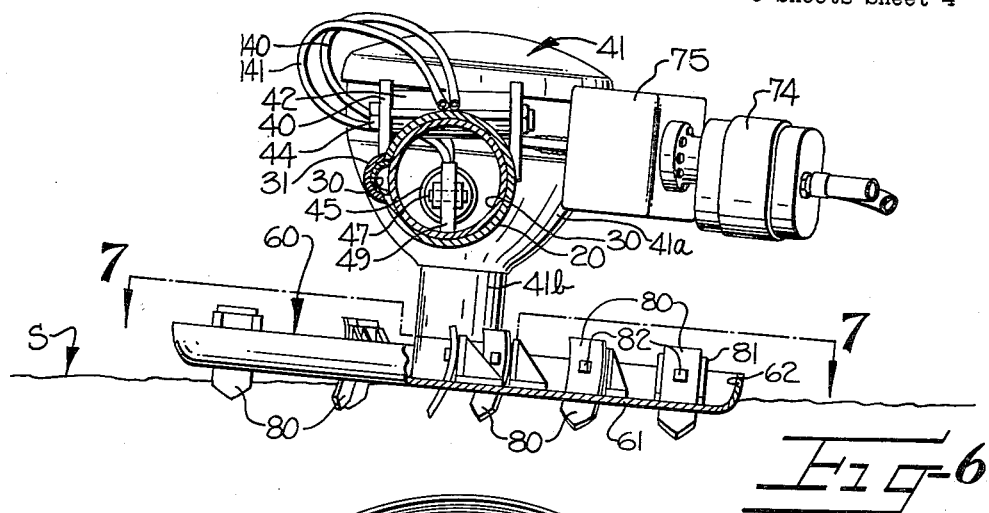
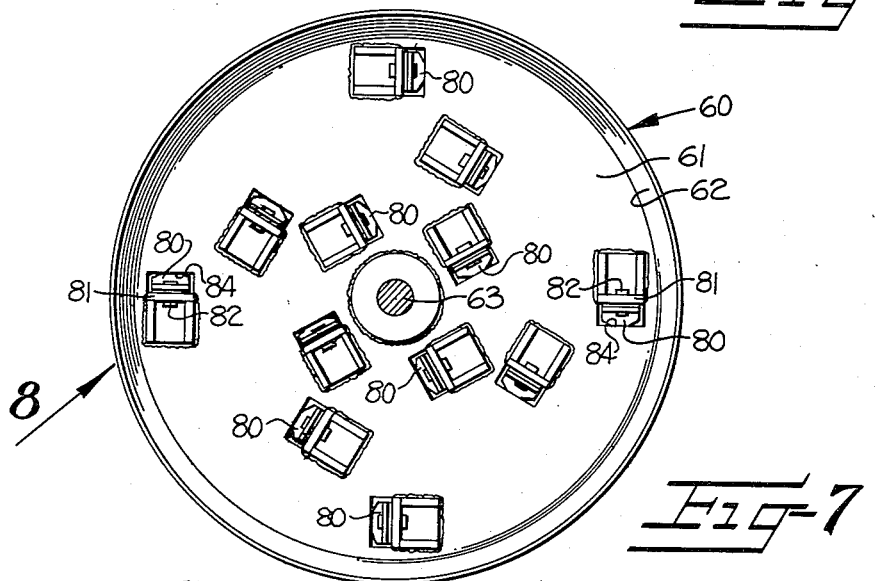
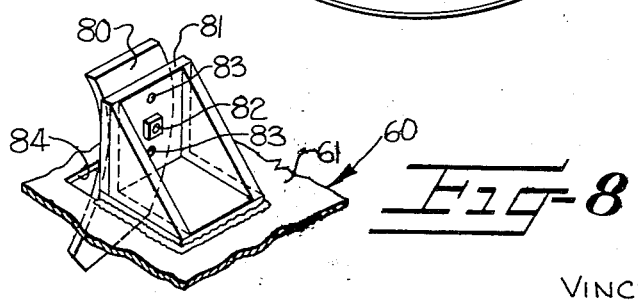
INVENTOR:
VINCENT G. CAGGIANO, JR.
BY Eaton, Bell, Hunt & Seltzer
ATTORNEYS

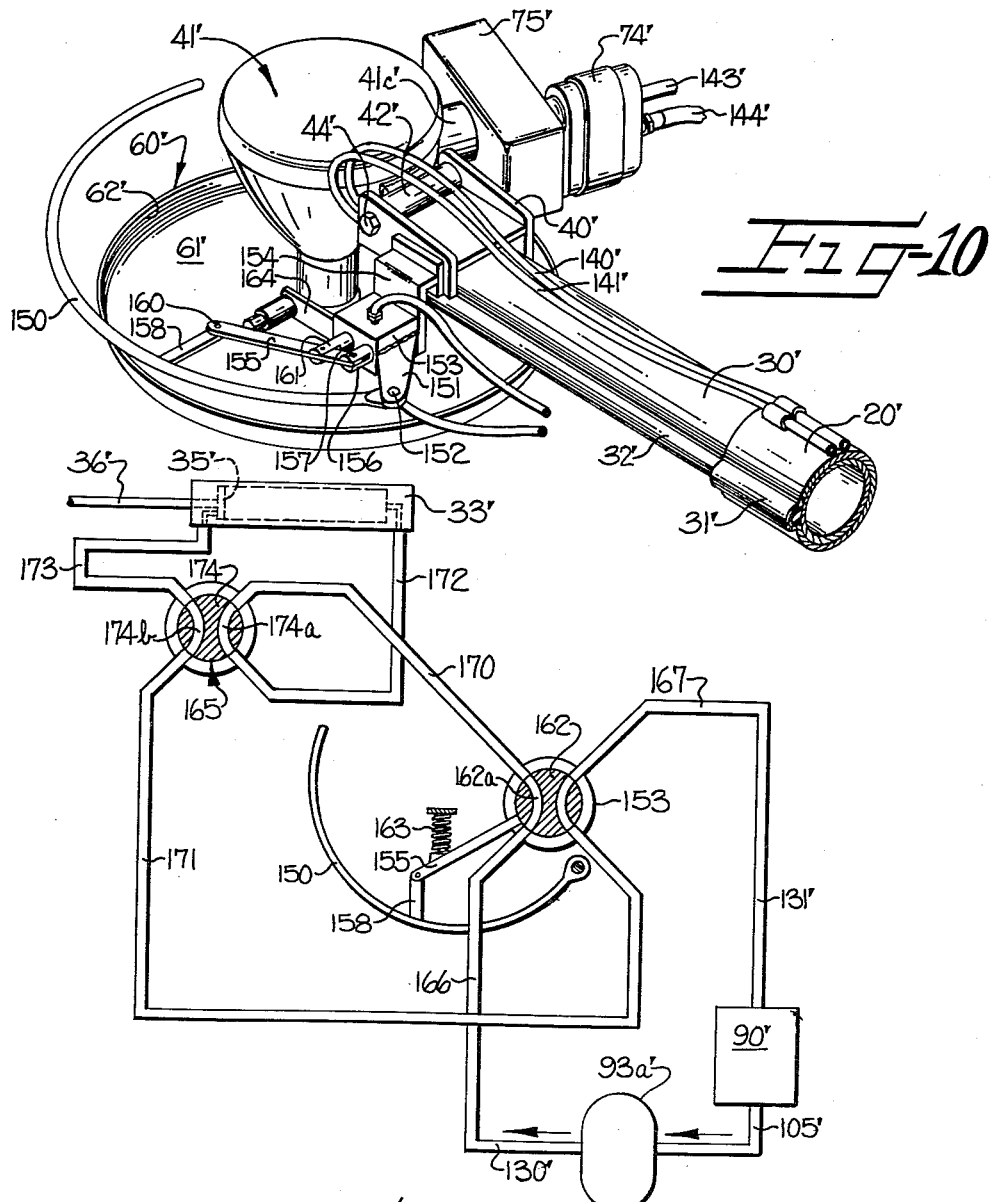

3,117,632
CULTIVATOR
Vincent G. Caggiano, Jr., Gaffney, S.C.
Filed June 15, 1961, Ser. No. 117,395
9 Claims. (Cl. 172—5)

This invention relates to cultivators and more particularly to rotary cultivators particularly devised for cultivating between plants, such as trees and the like, planted in rows.

An important feature of the present invention resides in the provision of a cultivator having a rotary cultivating tool which may be used to cultivate between plants, particularly trees, in a row and closely adjacent thereto without causing damage to the plants or the roots thereof, which cultivating tool is maintained in substantially the same attitude relative to the surface despite irregularities in the slope of the surface.

Another important feature of the present invention resides in the mounting for the cultivator of the character last described upon a vehicle such as a tractor for extendable and retractable lateral movement relative to the vehicle so that the rotary cultivator may be moved between the plants in a row and may be retracted therefrom as the tool approaches one of the plants such that the vehicle may move in a straight line between the rows while still cultivating between the plants in the row.

Generally, the cultivator of the present invention is of extremely compact and strong construction and comprises a tubular supporting member pivotally mounted on the tractor for pivotal movement about a horizontal axis, a hydraulic cylinder-piston mechanism mounted on the tractor and connected to the supporting member for varying the angle of the supporting member relative to the horizontal for controlling the depth of penetration of the tool, a tubular arm telescopically mounted on the tubular supporting member and extendable and retractable relative thereto, a hydraulic cylinder-piston mechanism mounted within the tubular supporting member and connected to the extendable and retractable arm for moving the arm relative to the supporting member, a supporting housing mounted for pivotal movement about a transverse horizontal pivot on the end of said arm, a rotary cultivating tool mounted on said supporting housing and extending downwardly therefrom into engagement with the surface, and a hydraulic motor mounted on said housing and operatively connected to the rotary tool for rotating the same as it moves over the surface. The rotary cultivator and the hydraulic piston cylinder mechanisms are suitably driven by a hydraulic pump which is driven from the tractor motor power take-off unit. Suitable control valves are provided adjacent the operator of the tractor for manual control of the different hydraulically operable mechanisms for controlling the operation of the device.

It is therefore an object of the present invention to provide a novel cultivator having a rotary cultivating tool adapted to be mounted laterally outwardly of a vehicle wherein the lateral position of the tool may be varied as desired and wherein the attitude of the tool relative to the horizontal may be changed to maintain the tool in substantially the same attitude relative to a surface to be cultivated despite irregularities in the slope of that surface.

A more specific object of the present invention is to provide a cultivator of the character described having a supporting member adapted to be mounted on a vehicle for pivotal movement about a horizontal pivot and including means for changing the angle between the supporting member and the horizontal for varying the depth of penetration of the cultivating tool relative to the surface, an arm telescopically mounted on the supporting member and including means for extending and retracting the same relative to the supporting member and means mounting the cultivating tool for pivotal movement about a transverse horizontal pivot on the extendable and retractable arm and including means for varying the attitude of the tool relative to the horizontal for maintaining the tool in substantially the same attitude relative to the surface despite irregularities in the slope thereof.

Another object of the present invention is to provide a cultivator of the character last described of extremely compact construction while of sufficient strength to withstand the high degree of stresses applied thereto by the movement of the vehicle over the surface and the engagement of the tool therewith. This compact construction provides a cultivator which is more easily mounted on and dismounted from a vehicle and one which is wholly carried thereby without the necessity of providing auxiliary supports therefor.

A further object of the present invention is to provide a cultivator of the character described which may be rotated in either direction to vary the amount of cultivation performed upon the surface.

A still further object of the present invention is to provide a cultivator of the character described having means for retracting the tool from between the plants of a row as the same approaches a plant in its path and for returning the tool to its original position when the same has moved past the plant in its path. This retraction and extension is responsive to the approach of the tool toward and the moving of the same away from the plant in its path.

Some of the objects of the present invention having been stated, other objects will appear as the description proceeds when taken in connection with the accompanying drawings, in which—

FIGURE 2 is an enlarged plan of the apparatus shown in FIGURE 1 with portions broken away for clarity in viewing the elements therebeneath;

FIGURE 3 is an enlarged fragmentary section taken substantially along line 3—3 of FIGURE 2 with portions broken away;

FIGURE 4 is an enlarged fragmentary sectional plan taken substantially along line 4—4 in FIGURE 1;

FIGURE 5 is an enlarged section taken substantially along line 5—5 in FIGURE 1;

FIGURE 6 is an enlarged sectional view taken substantially along line 6—6 in FIGURE 1;

FIGURE 7 is a sectional plan taken substantially along line 7—7 in FIGURE 6;

FIGURE 8 is an enlarged detail looking in the direction of arrow 8 in FIGURE 7;

FIGURE 10 is an isometric with portions broken away of the cultivating tool of the present invention with a feeler attachment added; and FIGURE 11 is a schematic view of the hydraulic system controlled by the feeler mechanism illustrated in FIGURE 10.

Figures 1, 9:
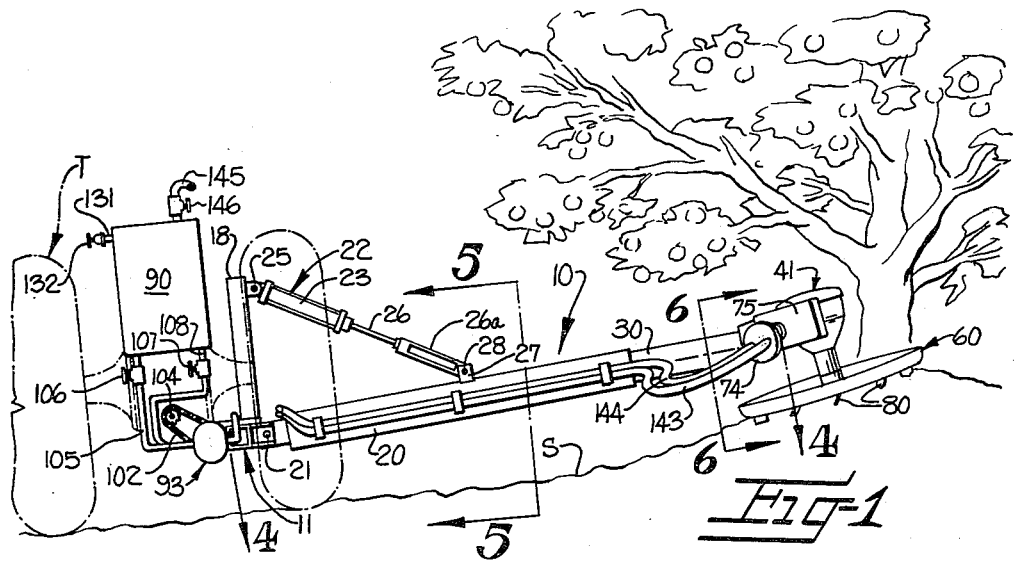
FIGURE 1 is a rear elevational view of the apparatus of the present invention mounted on a tractor shown in phantom lines.
FIGURE 9 is a schematic view of the hydraulic system for the apparatus of the present invention.

Referring now to the drawings and more particularly to FIGURE 1, there is shown a cultivator broadly indicated at 10 which embodies the features of the present invention and is shown mounted upon a vehicle such as a tractor T shown in phantom lines. Cultivator 10 comprises a supporting frame 11 (FIGURE 2) mounted on the tractor. Frame 11 comprises a longitudinal member 12 adapted to extend longitudinally of the tractor when mounted thereon. Member 12 has a bracket member 13 mounted on one end thereof and extending laterally outwardly therefrom. Bracket member 13 has a pair of holes 13a formed therein for the reception of suitable bolts 13b to mount bracket member 13 on the undercarriage of the tractor T. A second bracket member 14 is mounted on member 12 adjacent its other end and extends laterally therefrom to a point underlying the undercarriage of the tractor at a point just rearwardly of the motor. Bracket member 14 has portions 15, 16 extending upwardly on opposite sides of the tractor frame and are mounted thereon by suitable bolts 15a, 16a. A bracket 17 (FIGURE 4) comprising two spaced apart laterally extending members 17a, 17b are mounted on the opposite side of member 12 from bracket member 14. The two spaced apart members 17a, 17b of bracket 17 have suitably alined holes therein for reasons to be presently described. An upstanding post 18 is mounted on the top of a plate 19 which, in turn, is mounted on member 12 and the top of bracket 17. Post 18 has two outwardly extending spaced apart members 18a, 18b having suitably alined openings therein for reasons to be presently described.

It is noted that the frame 11 may be of any suitable construction which may be varied to accommodate the frames of the several different types of tractors presently on the market. Frame 11 is preferably constructed in such a manner that it may remain mounted on the tractor when the tractor is not being used with the cultivator of the present invention since the frame will not interfere with the normal operation of the tractor for other purposes. This feature considerably reduces the time and labor involved in mounting the cultivating tool on the tractor and in removing the same therefrom.

An outwardly extending, preferably tubular, supporting member 20 is mounted on bracket 17 by bracket portions 20a, 20b mounted on the end of member 20 by any suitable means and insertable between the spaced apart members 17a, 17b of bracket 17. Bracket portions 20a, 20b have suitable holes formed therein which are alined with each other and are adapted to be alined with the holes in members 17a, 17b. A pin 21 is inserted into the alined holes in members 17a, 17b and bracket portions 20a, 20b with a relatively tight fit in the holes in members 17a, 17b, but with a loose fit in the holes in bracket portions 20a, 20b to allow member 20 to pivot about pin 21.

Supporting member 20 is supported outwardly of pivot pin 21 by a cylinder-piston mechanism 22 and is moved thereby about pivot pin 21 in a manner to be presently described. Cylinder-piston mechanism 22 comprises a cylinder 23 mounted on post 18 by a reduced portion 24 inserted between members 18a, 18b and having a suitable hole therein which is alined with the holes in members 18a, 18b. The alined holes in members 18a, 18b and reduced portion 24 are penetrated by a pin 25 which serves as a pivot for cylinder 23. It is noted that pins 21 and 25 comprise the only mounting points for mounting supporting member 20 on frame 11 so that the same is easily and quickly mounted on and dismounted from the tractor. Cylinder 23 has a suitable piston (not shown) therein which is moved therein in a manner to be presently described. A piston rod 26 extends outwardly and downwardly from the piston through one end of the cylinder 23 and is connected by a pivot pin 28 at its outer or lower end to a suitable bracket 27 mounted on supporting member 20. Piston rod 26 has a portion 26a which is adjustable lengthwise so that the distance between the outer end of cylinder 23 and bracket 27 on supporting member 20 may be varied to vary the position of supporting member 20 when the piston and its piston rod 26 are in the extended and retracted position.

An arm 30 (FIGURE 4) is telescopically mounted within supporting member 20 and preferably comprises a tubular member of an outside diameter substantially equal to the inside diameter of the supporting member 20 such that a relatively tight fit is provided between the two telescopically arranged members. However, the outside diameter of arm 30 is of such a dimension that the same may be easily extended and retracted relative to the supporting member for reasons to be presently described. Supporting member 20 is preferably provided with an offset portion or keyway 31 which receives a projection or key 32 mounted on arm 30 for maintaining the arm against rotation in supporting member 20.

A hydraulic cylinder 33 is mounted within supporting member 20 by a bracket portion 34 mounted on one end thereof and extending outwardly between bracket portions 20a, 20b. Bracket portion 34 has a suitable hole formed therein which is penetrated by pivot pin 21 releasably retaining cylinder 33 within supporting member 20. A piston 35 is mounted in cylinder 33 and has a piston rod 36 extending outwardly therefrom to a position outside cylinder 33 where it terminates in a yoke 37. Yoke 37 is penetrated by a pin 38 which is mounted at its opposite ends on the extendable and retractable arm 30 such that arm 30 is fixed to piston rod 36 for movement therewith. Piston 35 is extended and retracted in cylinder 33 by the introduction of hydraulic fluid into cylinder 33 on the corresponding side of piston 35 in a manner to be presently described.

Arm 30 extends outwardly beyond the outer end of supporting member 20 when the same is in the retracted position and terminates in a free end portion. A bracket 40 is mounted on the free end portion of arm 30 by any suitable means such as welding or the like. A housing 41 is mounted on bracket 40 by a collar 42 mounted on housing 41 by a connecting member 43 which is secured to collar 42 and housing 41 by any suitable means such as welding or the like. Collar 42 is penetrated by a suitable bolt 44 or the like which also extends through the legs of bracket 40 for mounting housing 41 for pivotal movement about a horizontal axis transversely of arm 30. A hydraulic cylinder 45 is mounted within arm 30 by a yoke member 46 mounted on one end thereof and having a pin 47 mounted at its opposite ends on the legs thereof and extending therebetween. Pin 47 is received in an open-ended slot 48 formed in a bracket 49 mounted on arm 30 for releasably mounting cylinder 45 therein. A piston (not shown) is positioned within cylinder 45 for extension and retraction in a manner to be presently described and has a piston rod 50 extending outwardly therefrom through the opposite end of cylinder 45 from yoke member 46. Piston rod 50 has a suitable fork member 51 on the outer end thereof which straddles a bracket 52 mounted on housing 41 by any suitable means such as welding or the like. Fork member 51 is pivotally connected to bracket 52 by a pin 53 extending through alined openings in fork member 51 and bracket 52.

Housing 41 has an upper portion 41a which encloses a suitable gear reduction to be later described and a lower portion 41b which serves as a suppporting bearing for the cultivating tool of the present invention. The cultivating tool is broadly indicated at 60 and comprises a preferably circular pan member 61 having a substantially flat bottom and an upturned side edge 62. Pan 61 is fixed to the lower end of a shaft 63 which is journaled for rotation in the bearing portion 41b of housing 41. A bevel gear 64 is drivingly mounted on the upper end of shaft 63 within upper portion 41a of housing 41 and serves to maintain shaft 63 within bearing portion 41b.

Housing 41 has a portion 41c extending outwardly therefrom which journals a shaft 65 in suitable bearings provided therein. The inner end of shaft 65 drivingly mounts a second bevel gear 66 which drivingly engages bevel gear 64. It is noted that bevel gear 66 is considerably smaller than bevel gear 64 such that a speed reduction occurs between shafts 65 and 63. A sprocket 70 is drivingly mounted on the outer end of shaft 65 and supports one end of a sprocket chain 71. The opposite end of sprocket chain 71 is drivingly supported by a sprocket 72 mounted on the output shaft 73 of a hydraulic motor 74 which, in turn, is mounted on a casing 75 which encloses sprockets 70, 72 and sprocket chain 71. Casing 75 is mounted on a bracket 76 which, in turn, is mounted on housing 41. Motor 74 is of the conventional gear type which may be purchased on the commercial market and therefore the same will not be described in detail.

A plurality of cultivating teeth 80 are mounted on upstanding brackets 81 by bolts 82 penetrating through a suitable hole formed in each of the teeth and one of a plurality of spaced apart vertically alined holes 83 formed in each of the brackets 81. Brackets 81 are mounted on the upper surface of pan 61 by any suitable means such as welding and cultivating teeth 80 extend downwardly therefrom through suitable openings 84 formed in pan 61. It is noted that the distance the teeth extend below the bottom surface of pan 61 determines to a considerable extent the depth of penetration thereof into the surface S and consequently the depth of cultivation thereof. This distance is suitably varied by the selection of a particular one of the holes 83 for the reception of bolts 82. Cultivating teeth 80 are curved in the normal direction of rotation of the pan 61 for maximum cultivation.

A hydraulic reservoir 90 is provided for supplying hydraulic fluid for operation of the aforementioned hydraulic cylinder-piston mechanisms 23, 33, 45 and the hydraulic motor 74. Reservoir 90 (FIGURE 5) is suitably mounted on the rear portion of the tractor T by a bracket 91 which is mounted on the tractor frame by a pair of bolts 92. A two-stage hydraulic pump 93 (FIGURE 2) is mounted on a bracket member 94 by a pair of bolts 95. Bracket member 94 is mounted on longitudinal member 12 by any suitable means such as welding or the like. Hydraulic pump 93 (FIGURE 9) is of the driven gear type and serves to provide hydraulic fluid under pressure to the above-described hydraulically operated mechanisms. The first stage 93a of hydraulic pump 93 has a pair of matingly engaged gears 96, 97 and the second stage 93b of hydraulic pump 93 has a pair of matingly engaged gears 98, 99 therein. Gears 96, 98 are mounted on a shaft 100 for rotation therewith, which shaft extends outwardly from pump 93. A sprocket 101 is drivingly mounted on the outer end of shaft 100 and supports one end of a suitable chain 102. The opposite end of chain 102 is drivingly supported by a sprocket 103 mounted on the output shaft 104 of the power take-off unit P of the tractor T.

First stage 93a of pump 93 is connected to reservoir 90 by a pipe 105 through a suitable valve 106. Second stage 93b of pump 93 is connected to reservoir 90 by a pipe 107 through a suitable valve 108. Valves 106 and 108 are manually operable and are for stopping the flow of hydraulic fluid to pump 93 when the same is not in use.

Control valves 110, 111 and 112 are provided for controlling the operation of the hydraulic cylinder-piston mechanisms 23, 33, 45, respectively, and a reversing valve 113 is provided for reversing the hydraulic motor 74 to reverse the direction of rotation of tool 60. Valves 110, 111, 112 and 113 are mounted on a bracket member 114 which, in turn, is mounted on post 18 by a connecting member 115 (FIGURE 5). Valves 110, 111, 112 and 113 have core members 116, 117, 120 and 121 therein, respectively, which are rotatable to control the flow of hydraulic fluid to the hydraulically operable mechanisms in a manner to be later described. Core members 116, 117, 120, 121 of valves 110, 111, 112, 113 are preferably manually rotated within the valve casings by handles 122, 123, 124 and 125 pivotally mounted on the valve casings and operatively connected to the core members.

A pipe 130 (FIGURE 9) is connected at one end to first stage 93a of pump 93 and at its other end to valve 110 in communication with core member 116. A hydraulic return pipe 131 is connected at one end to valve 110 in communication with core member 116 and at its other end with reservoir 90 through a suitable valve 132. A pipe 133 is connected at one end to valve 110 in communication with core member 116 and at its other end to cylinder 23 in communication with the interior thereof on the lower side of the piston positioned therein. Core member 116 has a first passage 116a therein which is in alinement with pipes 130 and 131 when valve 110 is in the inoperative or rest position so that the hydraulic fluid delivered to valve 110 passes through passage 116a and returns to reservoir 90 by way of pipe 131. Core member 116 has a second passage 116b formed therein which is moved into alinement with and serves to connect pipes 130 and 133 when core member 116 is rotated in one direction from the rest position. The connection of pipes 130 and 133 delivers fluid to cylinder 23 on the lower side of the piston and thereby raises the piston in the cylinder. Passage 116b is moved into alinement with and serves to connect pipes 133 and 131 when core member 116 is rotated in the other direction from the rest position to allow fluid to escape from cylinder 23 and return to reservoir 90 and the piston to be lowered by gravity. It is noted that when core member 116 is in the rest position, pipe 133 is not connected to either pipe 130 or pipe 131 such that no fluid is delivered to or escapes from cylinder 23 and therefore the piston is held in a static position.

A pipe 134 is connected at one end to pipe 130 and at its other end to valve 111 in communication with core member 117. A pipe 135 is connected at one end to valve 111 and at its other end to pipe 131 and a pipe 136 is connected at one end to valve 111 and at its other end to cylinder 33 in communication with the interior thereof on one side of piston 35. Another pipe 137 is connected to valve 111 on the opposite side from pipe 136 and at its other end to cylinder 33 on the opposite side of piston 35 from pipe 136.

Core member 117 has a first passage 117a therein which connects pipe 134 to pipe 135 when core member 117 is in the inoperative or rest position. Core member 117 has a second passage 117b therein which connects pipe 134 to pipe 136 when core member 117 is rotated in one direction from the rest position for delivering fluid to cylinder 33 on said one side of piston 35 and which connects pipe 136 to pipe 135 when core member 117 is rotated in the other direction from the rest position to allow fluid to escape from cylinder 33 on said one side of piston 35. Core member 117 has a third passage 117c therein which connects pipe 134 to pipe 137 when core member 117 is rotated in said other direction from the rest position to deliver fluid to cylinder 33 on said opposite side of piston 35 while fluid is escaping from the cylinder on said one side through passage 117b and which connects pipe 137 to pipe 135 to allow fluid to escape from cylinder 33 on said opposite side of piston 35 while fluid is being delivered to the cylinder on said one side of piston 35.

A pipe 138 is connected at one end to pipe 130 and at its other end to valve 112 and another pipe 139 is connected at one end to valve 112 and at its other end to pipe 131. A pipe 140 is connected at one end to valve 112 and at its other end to cylinder 45 on one side of the piston therein and another pipe 141 is connected at one end to valve 112 and at its other end to cylinder 45 on the other side of the piston therein. Core member 120 has first, second and third passages 120a, 120b and 120c therein which connects pipe 138 to pipe 139; pipe 138 to pipe 140; pipe 140 to pipe 139; pipe 138 to pipe 141; and pipe 141 to pipe 139 in the same manner as passages 117a, 117b and 117c connect the corresponding pipes 134, 135, 136 and 137.

Valve 113 is connected to second stage 93b of hydraulic pump 93 by a supply line 142 and is connected to one side of fluid motor 74 by a pipe 143. A pipe 144 connects the other side of fluid motor 74 to valve 113 and another pipe 145 connects valve 113 to reservoir 90 through a valve 146. Core member 121 of valve 113 has a passage 121a therein which connects pipe 142 to pipe 143 and a passage 121b which connects pipe 144 to pipe 145 when core member 121 is in the normal position and when fluid motor 74 is to be driven in the normal direction. Passage 121a connects pipe 142 to pipe 144 and passage 121b connects pipe 143 to pipe 145 when core member 121 is rotated by handle 125 from the normal position. It is noted that this position of core member 121 delivers fluid through pipes 142 and 144 to the other side of motor 74 to reverse the direction of rotation of output shaft 73.

In the embodiment shown in FIGURES 1 through 9, all of the valves 110, 111, 112 and 113 for controlling the hydraulically operable mechanisms are manually operated by means of the handles 122, 123, 124 and 125. Turning now to a description of the apparatus shown in FIGURES 10 and 11 wherein like reference characters with the prime notation added are used to designate like parts, an apparatus is shown for automatically controlling the retraction of arm 30' relative to supporting member 20' as the cultivating tool approaches an obstacle in its path and for extending the same once the obstacle is passed. This apparatus comprises a feeler member 150 which is mounted at one end on a bracket 151 by a pivot pin 152 for pivotal movement toward and away from the cultivating tool 60'. Bracket 151 is mounted on a valve casing 153, which, in turn, is mounted on a bracket 154. Bracket 154 is mounted on bracket 40' which secures the same to arm 30' for movement therewith. Valve casing 153 has an actuating member 155 mounted thereon by a slotted member 156 which receives one end of member 155 in the slot thereof for pivotal movement about a pivot pin 157 which also secures member 155 to slotted member 156. Actuating member 155 is connected at its opposite end to the feeler member 150 by a connecting bracket 158 which is mounted on feeler member 150 at one end and is connected to actuating member 155 at its other end by a pivot pin 160. Actuating member 155 is suitably connected by a connecting link 161 to a core member 162 disposed within valve casing 153. A compression spring 163 is mounted at one end on a bracket 164 which, in turn, is mounted on valve casing 153 and is connected at the other end to actuating member 155 for biasing the actuating member 155 and feeler 150 to inactive position.

The valve made up by valve casing 153 and core member 162 is connected in series with a manually operable valve 165 (FIGURE 11) which is operated by a manually operable handle (not shown). A pipe 166 is connected at one end to pipe 130' and at the other end to valve casing 153 and a pipe 167 is connected at one end to valve casing 153 and at its other end to pipe 131'. A pair of pipes 170, 171 are connected at one end to valve casing 153 and at the other end to valve 165. A pipe 172 is connected at one end to valve 165 and at its other end to cylinder 33' on one side of piston 35' and a pipe 173 is connected at one end to valve 165 and at its other end to cylinder 33' on the opposite side of piston 35'.

Core member 162 has a first passage 162a therein which connects pipe 166 to pipe 170 and a second passage 162b therein which connects pipe 167 to pipe 171 when core member 162 is in the inactive position corresponding to the aforementioned inactive position of feeler 150 and actuating member 155. When core member 162 is rotated by the pivotal movement of actuating member 155 in response to engagement of feeler 150 with an obstacle in the path of tool 60', passage 162a connects pipe 167 to pipe 170 and passage 162b connects pipe 166 to pipe 171.

Valve 165 has a core member 174 therein which is operatively connected to the aforementioned manually operable handle for rotation between a first or normal position and a second or active position. Core member 174 has a first passage 174a therein which connects pipe 170 to pipe 172 and a second passage 174b therein which connects pipe 171 to pipe 173 when core member 174 is in the aforementioned first or normal position. When core member 174 is rotated by the manually operable handle to the second or active position, passage 174a connects pipe 170 to pipe 173 and passage 174b connects pipe 171 to pipe 172.

In operation, the cultivator frame 11 is mounted on the tractor T in the manner described above, and supporting member 20 is then mounted thereon by insertion of the pin 21 into the alined openings in the spaced apart members 17a, 17b and bracket portions 20a, 20b and the insertion of pin 25 into the alined openings in brackets 18a, 18b and portion 24 on the upper end of cylinder 23. The oil reservoir 90 is suitably mounted on the rear portion of the tractor T by bolts 92 and the hydraulic pump 93 is mounted on bracket 94. Sprocket chain 102 is mounted on sprocket 103 on the output shaft 104 of the tractor motor driven take-off unit P and around the sprocket 101 on shaft 100 of pump 93. The cultivator 10 is then mounted on the tractor T and is in condition for cultivating the surface S. The piston in cylinder 23 is raised or lowered by manually controlling valve member 110 through handle 122 in the manner described above to vary the angle between the supporting member 20 and the horizontal to position the cultivating tool 60 in correct position to perform its cultivating function upon the surface S. The lateral position of the cultivating tool 60 relative to the tractor is suitably varied by manually controlling valve 111 by handle 123 to aline the passages 117b, 117c therein with the corresponding pipes to extend or retract the piston 35 in cylinder 33 in the manner described above to extend or retract arm 30 in supporting member 20.

The angle between the shaft 63 of cultivating tool 60 and vertical is suitably varied by extending or retracting the piston in cylinder 45 to pivot housing 41 about its pivot pin 44 to suitably position the pan 61 in substantially the same attitude relative to the surface despite irregularities in the slope thereof such that the teeth 80 engage the surface with substantially the same degree of penetration on opposite sides of pan 61. It is noted, however, that pan 61 is canted at an acute angle relative to the horizontal in the direction of travel thereof so that the leading edge is at a higher elevation than the trailing edge such that the teeth 80 adjacent the trailing edge penetrate deeper into the surface S than do the teeth adjacent the leading edge. This canting of the pan 61 is to prevent digging in of the leading edge thereof into the surface and to provide smoother operation of the cultivating tool.

This tilting or pivoting of housing 41 by the piston in cylinder 45 is suitably controlled by valve 112 through handle 124 in the manner previously described so that the angle of tilt or the angle of the axis of rotation of the tool 60 may be varied as desired while the apparatus is in operation. Also, the attitude of the pan 61 relative to the surface may be changed such that the inward side of the pan is at a lower elevation than at the outward side such that tool 60 will push the dirt or soil outwardly thereof to form a ridge or the like adjacent is path of travel to form a suitable moisture retaining seed bed or the like. The amount of soil which is pushed outwardly by the tool 60 may be controlled as desired by varying the angle of tilt thereof.

Rotation of the tool 60 is suitably started and stopped by engaging or disengaging the power take-off of the tractor with the tool rotating continuously when the power take-off unit is engaged. However, by suitably controlling valve member 113 through handle member 125 in the aforementioned manner, the direction of rotation of tool 60 may be reversed. Since the cultivating teeth 80 are curved in the normal direction of rotation of the pan 61, if the direction of rotation thereof is reversed, the teeth 80 will not penetrate the surface S to the same depth as they would if it were rotating in the normal direction. Therefore, the reversing of the direction of rotation of tool 60 allows a control over the amount of cultivation performed thereby in addition to the control provided by the cylinder 23. Therefore, a finishing cultivation is performed upon the surface with a minimum disturbance of the surface by the teeth 80 and consequently a decreased chance of damage to the root system of the trees while still providing weed and grass removal by merely reversing the direction of rotation of pan 61.

The operation of the apparatus shown in FIGURES 10 and 11 is substantially the same as that described above except that the retraction of the arm 30' in the supporting member 20' is controlled by the feeler member 150. As the cultivating tool 60' moves between the plants in a row of plants, such as the tree shown in FIGURE 1, the same approaches the base of the plant and feeler 150 is moved into engagement therewith and is moved about its pivot 152. Feeler member 150 turns core member 162 by pivoting actuating member 155 against the action of spring 163.

Prior to the pivoting of feeler 150, the core members 162 and 174 are in the normal positions and passage 162a connects pipe 166 to pipe 170 and passage 162b connects pipe 167 to pipe 171. Passage 174a connects pipe 170 to pipe 172 and passage 174b connects pipe 171 to pipe 173. Hydraulic fluid is thereby delivered to cylinder 33' on the extension side of piston 35' and the same is maintained in the extended position so that tool 60' is disposed between the plants in a row. Upon rotation of core member 162, passage 162a connects pipe 167 to pipe 170 and passage 162b connects pipe 166 to pipe 171. Since core member 174 remains in the normal position, fluid is delivered to cylinder 33' on the retraction side of piston 35' and fluid escapes from the extension side so that piston 35' is moved to the retracted position and carries arm 30' and, hence, tool 60' therewith. This moves the tool away from the obstacle in its path and allows the same to move past the same. Once the obstacle is passed, feeler 150 is returned to inactive position, as is core member 162, by spring 163. Piston 35' is again moved to extended position which moves tool 60' back to a position between the plants.

It is noted that the manually operable valve 165 may be used to override the feeler operated valve at any time. With core member 162 in the normal position, piston 35' is retracted by rotating core member 174 in such a manner that passage 174a connects pipe 171 to pipe 172 and passage 174b connects pipe 170 to pipe 173. To again extend piston 35', it is only necessary to return core member 174 to the normal position. If core member 162 has been rotated by feeler 150 to a position to retract piston 35' and it is desired to extend piston 35' for any reason, this may be accomplished by rotating core member 174 of valve 165 in the same manner as aforementioned for retracting piston 35' with core member 162 in the normal position. It will therefore be seen that when both valves are in the extended position, the piston is extended; when one valve is in extended position and the other is in retracted position, the piston is retracted; and when both valves are in retracted position, the piston is extended.

It is therefore apparent that a novel cultivator is provided of extremely compact and simple construction which is inexpensive to manufacture and to maintain and which is easily and quickly mounted on and removed from a vehicle such as a tractor. Also, a novel cultivator is provided which is extremely simple to operate and is easily positioned between and withdrawn from the plants in a row by either manual or automatic operation to allow the same to move around the plants as the same moves along its path of travel. Still further, a novel cultivator is provided having two separate means for controlling the depth of penetration of the surface and which may be tilted to maintain substantially the same attitude relative to the surface despite irregularities in the slope thereof.

In the drawings and specification there have been set forth preferred embodiments of the invention and, although specific terms are employed, they are used in a generic and descriptive sense only and not for purposes of limitation, the scope of the invention being defined in the claims.

I claim:
1. A cultivator comprising a frame adapted to be mounted on a vehicle, a supporting member mounted on said frame for pivotal movement about a horizontal pivot and extending laterally outwardly therefrom, means mounted on said frame and operatively connected to said supporting member for adjusting the angle thereof relative to the horizontal, an extendable and retractable arm telescopically mounted on said supporting member and having a portion of said arm extending outwardly from said supporting member and terminating in a free end portion, means operatively connected to said supporting member and said arm for extending and retracting said arm relative to said supporting member, a rotatable cultivating tool adapted to penetratingly engage a surface to be cultivated, means mounting said tool on the free end portion of said arm for pivotal movement about a horizonal pivot, means operatively connected to said tool for rotating the same, and manually controlled hydraulic means carried by said arm and operatively connected to said tool mounting means for moving said tool about its horizontal pivot to change the angle of the cultivating tool relative to the horizontal corresponding to changes in the slope of the surface encountered during operation of said cultivator to maintain the tool in substantially the same attitude relative to the surface despite irregularities in the slope of the surface, the adjustment of the angle of said supporting member serving to vary the depth of penetration of said cultivating tool into the surface for varying the cultivating action on the surface.

2. A cultivator comprising a frame adapted to be mounted on a vehicle, a tubular supporting member mounted on said frame for pivotal movement about a horizontal pivot and extending laterally outwardly therefrom, means mounted on said frame and operatively connected to said supporting member for adjusting the angle thereof relative to the horizontal, an extendable and retractable tubular arm telescopically mounted in said tubular supporting member and having a portion of said arm extending outwardly from said supporting member and terminating in a free end portion, said tubular arm having an outside diameter substantially equal to the inside diameter of said tubular supporting member so that no relative transverse movement occurs therebetween, the outside diameter of said tubular arm being of such a dimension, however, to readily allow relative longitudinal movement of said arm in said supporting member, means mounted within said supporting member and operatively connected to said arm for extending and retracting said arm relative to said supporting member, a housing mounted on the free end portion of said arm for pivotal movement about a transverse horizontal pivot, a cultivating tool rotatably mounted on said housing and adapted to penetratingly engage a surface to be cultivated, means operatively connected to said tool for rotating the same relative to said housing, and manually controlled hydraulic means carried by said arm and operatively connected to said housing for moving said housing about its pivot to change the angle of the cultivating tool relative to the horizontal corresponding to changes in the slope of the surface encountered during operation of said cultivator for maintaining the tool in substantially the same attitude relative to the surface despite irregularities in the slope thereof, the adjustment of the angle of said supporting member serving to vary the depth of penetration of said tool into the surface for varying the cultivating action of said tool.

3. A cultivator comprising a frame adapted to be mounted on a vehicle, a tubular supporting member mounted on said frame for pivotal movement about a transverse horizontal pivot and extending laterally outwardly therefrom, first hydraulic means mounted on said frame and operatively connected to said supporting member for adjusting the angle of said supporting member relative to the horizontal, an extendable and retractable tubular arm telescopically mounted in said tubular supporting member and having a portion of said arm extending outwardly from said supporting member and terminating in a free end portion, said tubular arm having an outside diameter substantially equal to the inside diameter of said tubular supporting member so that no relative transverse movement occurs therebetween, the outside diameter of said tubular arm being of such a dimension, however, to readily allow relative longitudinal movement of said tubular arm in said supporting member, second hydraulic means mounted within said supporting member and operatively connected to said arm for extending and retracting said arm relative to said supporting member, a housing mounted on the free end portion of said arm for pivotal movement about a horizontal pivot transversely of said arm, a cultivating tool rotatably mounted on said housing for rotation about a vertical axis and adapted to engage a surface to be cultivated, reversible hydraulic motor means operatively connected to said tool for selectively rotating the tool in opposite directions, third hydraulic means carried by said arm and operatively connected to said housing for moving said housing about its pivot to change the angle of the cultivating tool relative to the horizontal corresponding to changes in the slope of the surface encountered during operation of said cultivator for maintaining the tool in substantially the same attitude relative to the surface despite irregularities in the slope thereof, the adjustment of the angle of said supporting member serving to vary the depth of penetration of said tool into the surface for varying the cultivating action of said tool a hydraulic pump operatively connected to said first, second and third hydraulic means and said hydraulic motor means for supplying hydraulic fluid thereto under pressure, a reservoir operatively connected to said pump for supplying hydraulic fluid thereto, and manually operable valve means positioned between said first, second and third hydraulic pump and said hydraulic means for controlling the delivery of hydraulic fluid to the several hydraulic means for causing the same to perform their respective functions.

4. The structure as set forth in claim 3 including manually operable valve means operatively disposed between said pump and said hydraulic motor means for controlling the direction of said hydraulic motor means and, hence, the direction of rotation of said cultivating tool to vary the cultivating action thereof.

5. The structure as set forth in claim 3 including feeler means pivotally mounted on said tubular arm and extending outwardly therefrom forwardly of said cultivating tool relative to the path of travel thereof, said feeler means being adapted to engage any obstacle in the path of said cultivating tool and to be moved thereby, and valve means operatively connected to said second hydraulic means in series with said manually operable valve means and responsive to movement of said feeler for rendering said second hydraulic means operable to retract said tubular arm and hence said cultivating tool away from the obstacle in its path.

6. A cultivator comprising a frame adapted to be mounted on a vehicle, a tubular supporting member mounted on said frame for pivotal movement about a transverse horizontal pivot and extending laterally outwardly therefrom, first hydraulic means mounted on said frame and being connected to said supporting member, a hydraulic pump operatively connected to said first hydraulic means for supplying hydraulic fluid under pressure thereto to adjust the angle of said supporting member relative to the horizontal, valve means disposed between said hydraulic pump and said first hydraulic means for controlling the flow of hydraulic fluid from said pump to said first hydraulic means, and extendable and retractable tubular arm telescopically mounted in said supporting member and having a portion of said arm extending outwardly from said supporting member and terminating in a free end portion, said tubular arm having an outside diameter substantially equal to the inside diameter of said tubular supporting member so that no relative transverse movement occurs therebetween, the outside diameter of said tubular arm being of such a dimension, however, to readily allow relative longitudinal movement of said arm in said supporting member, second hydraulic means mounted within said supporting member and being connected to said extendable and retractable tubular arm, means operatively connecting said second hydraulic means to said hydraulic pump, valve means disposed between said second hydraulic means and said hydraulic pump for controlling the flow of hydraulic fluid thereto to selectively extend and retract said arm relative to said supporting member, a housing mounted on the free end portion of said arm for pivotal movement about a horizontal pivot transversely of said arm, a cultivating tool rotatably mounted on said housing for rotation about a generally vertical axis and adapted to penetratingly engage a surface to be cultivated, a reversible hydraulic motor mounted on said housing and operatively connected to said tool for rotating said tool relative to said housing, means operatively connecting said hydraulic motor to said hydraulic pump for delivery of hydraulic fluid from said pump to said motor, valve means disposed between said hydraulic pump and said motor for selectively delivering hydraulic fluid to opposite sides of said hydraulic motor for controlling the direction of rotation thereof and hence the direction of rotation of said cultivating tool to vary the cultivating action thereof, the adjustment of the angle of said supporting member serving to vary the depth of penetration of said tool into the surface for varying the cultivating action of said tool, third hydraulic means mounted within said arm and being connected to said housing, means connecting said third hydraulic means to said hydraulic pump, and valve means disposed between said pump and said third hydraulic means for controlling the flow of hydraulic fluid from said pump to said third hydraulic means to selectively move said housing about its pivot to change the angle of the cultivating tool relative to the horizontal corresponding to changes in the slope of the surface encountered during operation of said cultivator for maintaining the tool in substantially the same attitude relative to the surface despite irregularities in the slope thereof.

7. The structure as set forth in claim 6 including a feeler pivotally mounted on said arm and extending outwardly therefrom forwardly of said tool relative to the path of travel thereof, said feeler being adapted to engage any obstacle in the path of said tool and to be moved about its pivot thereby, and valve means operatively connected between said hydraulic pump and said second hydraulic means and responsive to movement of said feeler for causing hydraulic fluid to be delivered to said second hydraulic means for retracting said tubular arm and hence said cultivating tool away from the obstacle in the path of said tool.

8. The structure as set forth in claim 7 including means for returning said feeler to its original position when the same is moved away from the obstacle by the retraction of said arm, and wherein said feeler actuated valve means responsive to the movement of the feeler to its original position causes hydraulic fluid to be delivered to said second hydraulic means for extending the tubular arm relative to said supporting member.

9. The structure as set forth in claim 8 wherein said manually operable valve means disposed between said second hydraulic means cylinder and said hydraulic pump is selectively operable to override said feeler actuated valve means at any time.

References Cited in the file of this patent
UNITED STATES PATENTS

| | | |
|---|---|---|
| 2,718,836 | Pertics et al. | Sept. 27, 1955 |
| 2,749,824 | Friday | June 12, 1956 |
| 2,882,978 | Smith et al. | Apr. 21, 1959 |
| 2,940,623 | Shook | June 14, 1960 |

UNITED STATES PATENT OFFICE
CERTIFICATE OF CORRECTION

Patent No. 3,117,632                            January 14, 1964

Vincent G. Caggiano, Jr.

It is hereby certified that error appears in the above numbered patent requiring correction and that the said Letters Patent should read as corrected below.

Column 8, line 55, for "is" read -- its --; column 11, line 30, after "tool" insert a comma; line 36, strike out "first, second and third" and insert the same after "said", same line 36; same column 11, line 70, for "and", first occurrence, read -- an --; column 12, line 65, strike out "cylinder".

Signed and sealed this 23rd day of June 1964.

(SEAL)
Attest:

ERNEST W. SWIDER                            EDWARD J. BRENNER
Attesting Officer                               Commissioner of Patents